United States Patent
Ciolek (10) Patent No.: US 12,067,363 B1
(45) Date of Patent: Aug. 20, 2024

(54) SYSTEM, METHOD, AND COMPUTER PROGRAM FOR TEXT SANITIZATION

(71) Applicant: ASAPP, Inc., New York, NY (US)

(72) Inventor: Daniel Alfredo Ciolek, Ciudad Autónoma de Buenos Aires (AR)

(73) Assignee: ASAPP, Inc., New York, NY (US)

( * ) Notice: Subject to any disclaimer, the term of this patent is extended or adjusted under 35 U.S.C. 154(b) by 300 days.

(21) Appl. No.: 17/679,830

(22) Filed: Feb. 24, 2022

(51) Int. Cl.
| | |
|---|---|
| *G06F 40/284* | (2020.01) |
| *G06F 40/242* | (2020.01) |
| *G06N 20/00* | (2019.01) |
| *G06V 30/262* | (2022.01) |
| *G06V 30/414* | (2022.01) |
| *H04L 9/32* | (2006.01) |

(52) U.S. Cl.
CPC .......... *G06F 40/284* (2020.01); *G06F 40/242* (2020.01); *G06N 20/00* (2019.01); *G06V 30/268* (2022.01); *G06V 30/414* (2022.01); *H04L 9/3236* (2013.01)

(58) Field of Classification Search
CPC ..... G06F 40/284; G06F 40/242; G06N 20/00; G06V 30/268; G06V 30/414; H04L 9/3236
See application file for complete search history.

(56) References Cited

U.S. PATENT DOCUMENTS

| | | |
|---|---|---|
| 5,649,060 A | 7/1997 | Ellozy et al. |
| 7,003,462 B2 | 2/2006 | Shambaugh et al. |
| 7,502,741 B2 | 3/2009 | Finke et al. |
| 7,633,551 B2 | 12/2009 | Sullivan |
| 8,068,588 B2 | 11/2011 | Ramanathan et al. |

(Continued)

FOREIGN PATENT DOCUMENTS

| | | | |
|---|---|---|---|
| CN | 106569998 A | 4/2017 | |
| CN | 112001484 A | * 11/2020 | ............... G06N 3/04 |

(Continued)

OTHER PUBLICATIONS

Alvarez-Melis, David et al., "Towards Robust Interpretability with Self-Explaining Neural Networks", 32nd Conference on Neural Information Processing Systems, 2018.

(Continued)

*Primary Examiner* — Mohammad K Islam
(74) *Attorney, Agent, or Firm* — Lessani Law Group, PC (57) ABSTRACT

A system, method, and computer program are provided for text sanitization. The system builds a corpus of document vectors (including tokenizing each document, creating a vector representation based on the tokens, and building a corpus of vector representations), obtains a new document for text sanitization, tokenizes the new document, creates a new document vector based on the tokens in the new document, and accesses the corpus of document vectors. The system filters each of the tokens in the new document against a privacy threshold. The system performs a k-anonymity sanitization process such that the new document vector becomes indistinguishable from at least k other document vectors in the corpus of document vectors. The system replaces or redacts the tokens in the document flagged as unsafe. The system updates the corpus of document vectors to include the new document vector in its form prior to the filtering and k-anonymity sanitization steps.

15 Claims, 8 Drawing Sheets

(56) References Cited

U.S. PATENT DOCUMENTS

| | | | |
|---|---|---|---|
| 8,086,458 | B2 | 12/2011 | Finke et al. |
| 8,131,545 | B1 | 3/2012 | Moreno et al. |
| 8,230,343 | B2 | 7/2012 | Logan et al. |
| 8,289,366 | B2 | 10/2012 | Greenwood et al. |
| 8,620,663 | B2 | 12/2013 | Kondo et al. |
| 8,665,863 | B2 | 3/2014 | Silverman |
| 9,313,332 | B1 | 4/2016 | Kumar et al. |
| 10,375,237 | B1 | 8/2019 | Williams et al. |
| 10,528,866 | B1 | 1/2020 | Dai et al. |
| 10,554,817 | B1 | 2/2020 | Sullivan et al. |
| 10,572,534 | B2 | 2/2020 | Readler |
| 11,055,055 | B1 | 7/2021 | Fieldman |
| 11,106,442 | B1 | 8/2021 | Hsiao et al. |
| 11,138,970 | B1 | 10/2021 | Han et al. |
| 11,238,278 | B1 | 2/2022 | Swanson et al. |
| 11,361,084 | B1* | 6/2022 | So ............... G06F 21/6245 |
| 11,487,944 | B1 | 11/2022 | Yang et al. |
| 11,521,639 | B1 | 12/2022 | Shon et al. |
| 11,663,407 | B2* | 5/2023 | Fusco ............. G06F 40/295 704/9 |
| 11,687,730 | B1 | 6/2023 | Yang et al. |
| 11,748,410 | B2* | 9/2023 | Kiefer ............. G06F 16/31 707/741 |
| 11,763,803 | B1 | 9/2023 | Griffiths et al. |
| 2002/0116361 | A1 | 8/2002 | Sullivan |
| 2003/0084300 | A1 | 5/2003 | Koike |
| 2003/0154072 | A1 | 8/2003 | Young et al. |
| 2004/0002970 | A1 | 1/2004 | Hur |
| 2005/0117879 | A1 | 6/2005 | Sullivan |
| 2005/0151880 | A1 | 7/2005 | Sullivan |
| 2005/0222036 | A1 | 10/2005 | During et al. |
| 2007/0011012 | A1 | 1/2007 | Yurick et al. |
| 2007/0206881 | A1 | 9/2007 | Ashikaga |
| 2008/0092168 | A1 | 4/2008 | Logan et al. |
| 2008/0107255 | A1 | 5/2008 | Geva et al. |
| 2010/0280828 | A1 | 11/2010 | Fein et al. |
| 2011/0238408 | A1 | 9/2011 | Larcheveque et al. |
| 2012/0140918 | A1 | 6/2012 | Sherry |
| 2012/0278071 | A1 | 11/2012 | Garland et al. |
| 2012/0331553 | A1 | 12/2012 | Aziz et al. |
| 2013/0039483 | A1 | 2/2013 | Wolfeld et al. |
| 2013/0071837 | A1 | 3/2013 | Winters-Hilt et al. |
| 2013/0124984 | A1 | 5/2013 | Kuspa |
| 2013/0129071 | A1 | 5/2013 | Teitelman et al. |
| 2013/0144674 | A1 | 6/2013 | Kim et al. |
| 2013/0191185 | A1 | 7/2013 | Galvin |
| 2014/0136443 | A1 | 5/2014 | Kinsey, II et al. |
| 2014/0140497 | A1 | 5/2014 | Ripa et al. |
| 2014/0168354 | A1 | 6/2014 | Clavel et al. |
| 2014/0229866 | A1 | 8/2014 | Gottlieb |
| 2014/0241519 | A1 | 8/2014 | Watson et al. |
| 2014/0258872 | A1 | 9/2014 | Spracklen et al. |
| 2015/0106091 | A1 | 4/2015 | Wetjen et al. |
| 2015/0195220 | A1 | 7/2015 | Hawker et al. |
| 2015/0235655 | A1 | 8/2015 | Dimitriadis et al. |
| 2015/0278225 | A1 | 10/2015 | Weiss et al. |
| 2015/0281436 | A1 | 10/2015 | Kumar et al. |
| 2015/0281445 | A1 | 10/2015 | Kumar et al. |
| 2015/0286627 | A1 | 10/2015 | Chang et al. |
| 2015/0341322 | A1 | 11/2015 | Levi et al. |
| 2016/0078339 | A1 | 3/2016 | Li et al. |
| 2016/0088153 | A1 | 3/2016 | Wicaksono et al. |
| 2016/0117339 | A1 | 4/2016 | Raskin et al. |
| 2016/0173693 | A1 | 6/2016 | Spievak et al. |
| 2016/0352907 | A1 | 12/2016 | Raanani et al. |
| 2016/0358321 | A1 | 12/2016 | Xu et al. |
| 2017/0062010 | A1 | 3/2017 | Pappu et al. |
| 2017/0187880 | A1 | 6/2017 | Raanani et al. |
| 2017/0300990 | A1 | 10/2017 | Tanaka et al. |
| 2018/0007204 | A1 | 1/2018 | Klein et al. |
| 2018/0007205 | A1 | 1/2018 | Klein et al. |
| 2018/0013699 | A1 | 1/2018 | Sapoznik et al. |
| 2018/0096271 | A1 | 4/2018 | Raanani et al. |
| 2018/0124243 | A1 | 5/2018 | Zimmerman |
| 2018/0130484 | A1 | 5/2018 | Dimino, Jr. et al. |
| 2018/0165554 | A1 | 6/2018 | Zhang et al. |
| 2018/0165723 | A1 | 6/2018 | Wright et al. |
| 2018/0204111 | A1 | 7/2018 | Zadeh et al. |
| 2018/0301143 | A1 | 10/2018 | Shastry et al. |
| 2019/0065515 | A1 | 2/2019 | Raskin et al. |
| 2019/0103095 | A1 | 4/2019 | Singaraju et al. |
| 2019/0132273 | A1* | 5/2019 | Ryan ............... H04L 63/1483 |
| 2019/0188590 | A1 | 6/2019 | Wu et al. |
| 2019/0189117 | A1 | 6/2019 | Kumar |
| 2019/0190890 | A1 | 6/2019 | Druker et al. |
| 2019/0205748 | A1 | 7/2019 | Fukuda et al. |
| 2019/0236204 | A1 | 8/2019 | Canim et al. |
| 2019/0251165 | A1 | 8/2019 | Bachrach et al. |
| 2019/0278942 | A1 | 9/2019 | Baudart et al. |
| 2019/0287114 | A1 | 9/2019 | Li |
| 2020/0097820 | A1 | 3/2020 | Song et al. |
| 2020/0098370 | A1 | 3/2020 | Arar et al. |
| 2020/0099790 | A1 | 3/2020 | Ma et al. |
| 2020/0153969 | A1 | 5/2020 | Dougherty et al. |
| 2020/0184207 | A1 | 6/2020 | Breslav |
| 2020/0184278 | A1 | 6/2020 | Zadeh et al. |
| 2020/0218780 | A1 | 7/2020 | Mei et al. |
| 2020/0227026 | A1 | 7/2020 | Rajagopal et al. |
| 2020/0242444 | A1 | 7/2020 | Zhang et al. |
| 2020/0265273 | A1 | 8/2020 | Wei et al. |
| 2020/0279567 | A1 | 9/2020 | Adlersberg et al. |
| 2020/0344194 | A1 | 10/2020 | Hosseinisianaki et al. |
| 2021/0074260 | A1 | 3/2021 | Gopala et al. |
| 2021/0081613 | A1 | 3/2021 | Begun et al. |
| 2021/0081615 | A1 | 3/2021 | McRitchie et al. |
| 2021/0089624 | A1 | 3/2021 | Bealby-Wright et al. |
| 2021/0103720 | A1 | 4/2021 | Kim et al. |
| 2021/0141861 | A1* | 5/2021 | Kalluri ............. G06F 40/284 |
| 2021/0157834 | A1 | 5/2021 | Sivasubramanian et al. |
| 2021/0233520 | A1 | 7/2021 | Sar Shalom et al. |
| 2021/0233535 | A1 | 7/2021 | Shir |
| 2021/0256417 | A1 | 8/2021 | Kneller et al. |
| 2021/0295822 | A1 | 9/2021 | Tomkins et al. |
| 2021/0304019 | A1 | 9/2021 | Anderson et al. |
| 2021/0304075 | A1 | 9/2021 | Duong et al. |
| 2021/0304747 | A1 | 9/2021 | Haas et al. |
| 2021/0304769 | A1 | 9/2021 | Ye et al. |
| 2021/0319481 | A1 | 10/2021 | Maheswaran et al. |
| 2022/0093101 | A1 | 3/2022 | Krishnan et al. |
| 2022/0094789 | A1 | 3/2022 | Lau et al. |
| 2022/0197306 | A1 | 6/2022 | Cella et al. |
| 2022/0198229 | A1 | 6/2022 | Onate Lopez et al. |
| 2022/0300885 | A1 | 9/2022 | Yannam et al. |
| 2022/0319514 | A1 | 10/2022 | Hosomi |
| 2022/0383867 | A1 | 12/2022 | Faulkner et al. |
| 2022/0391233 | A1 | 12/2022 | Decrop et al. |
| 2022/0394348 | A1 | 12/2022 | Hatambeiki et al. |
| 2022/0398598 | A1 | 12/2022 | Das et al. |

FOREIGN PATENT DOCUMENTS

| | | | | |
|---|---|---|---|---|
| CN | 116629804 B | * | 1/2024 | ......... G06F 16/3344 |
| WO | 2019076866 | | 4/2019 | |

OTHER PUBLICATIONS

Alvarez-Melis, David et al., "Gromov-Wasserstein Alignment of Word Embedding Spaces", Proceedings of the 2018 Conference on Empirical Methods in Natural Language Processing, pp. 1881-1890, Nov. 2018.

Bahdanau, Dzmitry et al., "Neural Machine Translation by Jointly Learning to Align and Translate", International Conference on Learning Representations, 2015.

Bastings, Jasmijn et al., "Interpretable Neural Predictions with Differentiable Binary Variables", Proceedings of the 57th Annual Meeting of the Association for Computational Linguistics, pp. 2963-2977, Aug. 2019.

Bellare et al., "Learning Extractors from Unlabeled Text using Relevant Databases", In Sixth International Workshop on Information Integration on the Web, 2007.

(56) References Cited

OTHER PUBLICATIONS

Beryozkin et al., "A Joint Named-Entity Recognizer for Heterogeneous Tag-sets Using a Tag Hierarchy", In Proceedings of the Association for Computational Linguistics (ACL), 2019.
Bickel, Steffen et al., "Multi-View Clustering", In Proceedings of the IEEE International Conference on Data Mining (ICDM) 2004.
Blitzer et al., "Domain Adaptation with Structural Correspondence Learning", In Proceedings of Empirical Methods for Natural Language Processing (EMNLP), 2006.
Bojanowski, Piotr, et al., "Enriching Word Vectors with Subword Information", Transactions of the Association for Computational Linguistics, vol. 5, pp. 135-146, 2017.
Bucilua et al., "Model Compression", In Proceedings of Knowledge Discovery and Data Mining (KDD), 2006.
Budzianowski, Pawel, et al., "MultiWOZ—A Large-Scale Multi-Domain Wizard-of-Oz Dataset for Task-Oriented Dialogue Modelling", In Proceedings of Empirical Methods for Natural Language Processing (EMNLP) 2018.
Chang, Shiyu et al., "A Game Theoretic Approach to Class-wise Selective Rationalization", In Advances in Neural Information Processing Systems, 2019.
Chaudhuri, Kamalika et al., "Multi-View Clustering via Canonical Correlation Analysis", In Proceedings of the International Conference on Machine Learning (ICML) 2009.
Chen et al., "Transfer Learning for Sequence Labeling Using Source Model and Target Data", In Proceedings of the National Conference on Artificial Intelligence (AAAI), 2019.
Chen, Jianbo et al., "Learning to Explain: An Information-Theoretic Perspective on Model Interpretation", Proceedings of the 35th International Conference on Machine Learning, 2018.
Chen, Liqun et al., "Adversarial Text Generation via Feature-Mover's Distance", 32nd Conference on Neural Information Processing Systems, 2018.
Cheung, Jackie Chi Kit et al., "Sequence Clustering and Labeling for Unsupervised Query Intent Discovery", In Proceedings of the ACM International Conference on Web Search and Data Mining (WSDM) 2012.
Cho, J., et al. "Deep Neural Networks for Emotion Recognition Combining Audio and Transcripts," Proc. Interspeech 2018, pp. 247-251.
Cieri, C., et al. "The Fisher Corpus: a Resource for the Next Generations of Speech-to-Text" In LREC, vol. 4, 2004, pp. 69-71.
Ciresan, Dan et al., "Multi-column Deep Neural Networks for Image Classification", In IEEE Conference on Computer Vision and Pattern Recognition, 2012.
Cuturi, Marco "Sinkhorn Distances: Lightspeed Computation of Optimal Transportation Distances", In Advances in Neural Information Processing Systems, pp. 2292-2300, 2013.
David et al., "Analysis of Representations for Domain Adaptation", In Neural Information Processing Systems (NIPS), 2007.
Deepak, Padmanabhan "Mixkmeans: Clustering Question-Answer Archives", In Proceedings of Empirical Methods for Natural Language Processing (EMNLP) 2016.
Devlin, J., et al. "BERT: Pre-training of Deep Bidirectional Transformers for Language Understanding," 2018.
Ganin et al., "Unsupervised Domain Adaptation by Backpropagation", In Proceedings of the International Conference on Machine Learning (ICML), 2015.
Glorot et al., "Domain Adaptation for Large-Scale Sentiment Classification: A Deep Learning Approach", In Proceedings of the International Conference on Machine Learning (ICML), 2011.
Greenberg et al., "Marginal Likelihood Training of BiLSTM-CRF for Biomedical Named Entity Recognition from Disjoint Label Sets", In Proceedings of Empirical Methods for Natural Language Processing (EMNLP), 2018.
Haghani, P., et al. "From Audio to Semantics: Approaches to End-to-End Spoken Language Understanding," In 2018 IEEE Spoken Language Technology Workshop (SLT), IEEE, 2018, pp. 720-726.
Han, K. J., et al. "Multistream CNN for Robust Acoustic Modeling," 2020.
Haponchyk, Iryna et al., "Supervised Clustering of Questions into Intents for Dialog System Applications", In Proceedings of Empirical Methods for Natural Language Processing (EMNLP) 2018.
Harvard Business Review Analytic Services, "Real Time Analytics", Harvard Business Review, Jun. 4, 2018.
Hemphill, Charles T., et al., "The Atis Spoken Language Systems Pilot Corpus", In Proceedings of the Workshop on Speech and Natural Language, 1990.
Henderson, Matthew et al., "The Second Dialog State Tracking Challenge", In Proceedings of the Annual Meeting of the Special Interest Group on Discourse and Dialogue (SIGDIAL) 2014.
Henderson, Matthew et al., "Word-Based Dialog State Tracking with Recurrent Neural Networks", In Proceedings of the 15th Annual Meeting of the Special Interest Group on Discourse and Dialogue (SIGDIAL) 2014.
Hinton et al., "Distilling the Knowledge in a Neural Network", 2015.
Hooker, Andrew "Improving the State Machine of Your Business", Nov. 15, 2018, pp. 1-11.
Huang et al., "Learning a Unified Named Entity Tagger From Multiple Partially Annotated Corpora For Efficient Adaptation", In Proceedings of the Conference on Natural Language Learning (CoNLL), 2019.
Jain, Sarthak et al., "Attention is not Explanation", 2019.
Jansen, Bernard et al., "Classifying the User Intent of Web Queries Using k-means Clustering", Internet Research, vol. 20, No. 5, 2010.
Jeon, Jiwoon, "Finding Similar Questions in Large Question and Answer Archives", In Proceedings of the ACM International Conference on Information and Knowledge Management (CIKM) 2005.
Jie et al., "Better Modeling of Incomplete Annotations for Named Entity Recognition", In Proceedings of the North American Chapter of the Association for Computational Linguistics (NAACL), 2019.
Kanaan-Izquierdo, Samir et al., "Multiview and Multifeature Spectral Clustering Using Common Eigenvectors", Pattern Recognition Letters, 102, 2018.
Kim, E., et al. "DNN-Based Emotion Recognition Based on Bottleneck Acoustic Features and Lexical Features," In ICASSP 2019-2019 IEEE International Conference on Acoustics, Speech and Signal Processing (ICASSP), IEEE, 2019, pp. 6720-6724.
Kim, Seokhwan et al., "The Fifth Dialog State Tracking Challenge", In Proceedings of the IEEE Spoken Language Technology Workshop (SLT) 2016.
Kim et al., "Sequence-Level Knowledge Distillation", In Proceedings of Empirical Methods for Natural Language Processing (EMNLP), 2016.
Kim, S., et al. "Joint CTC—Attention Based End-to-End Speech Recognition Using Multi-Task Learning," In 2017 IEEE International Conference on Acoustics, Speech and Signal Processing (ICASSP), IEEE, 2017, pp. 4835-4839.
Kumar, Abhishek et al., "Co-regularized Multi-View Spectral Clustering", In Neural Information Processing Systems (NIPS) 2011.
Kuo, et al. "End-to-End Spoken Language Understanding Without Full Transcripts," 2020.
Kusner, Matt J., et al., "From Word Embeddings To Document Distances", Proceedings of the 32nd International Conference on Machine Learning, vol. 37, ICML'15, pp. 957-966, JMLR.org, 2015.
Lafferty et al., "Conditional Random Fields: Probabilistic Models for Segmenting and Labeling Sequence Data", In Proceedings of the International Conference on Machine Learning (ICML), 2001.
Zadeh, A., et al. "Multimodal Language Analysis in the Wild: CMU-MOSEI Dataset and Interpretable Dynamic Fusion Graph," In Proceedings of the 56th Annual Meeting of the Association for Computational Linguistics (vol. 1: Long Papers), 2018, pp. 2236-2246.
Lample et al., "Neural Architectures for Named Entity Recognition", In Proceedings of the North American Chapter of the Association for Computational Linguistics (NAACL), 2016.
Lei, Tao et al., "Rationalizing Neural Predictions", Proceedings of the 2016 Conference on Empirical Methods in Natural Language Processing, pp. 107-117, Nov. 2016.

(56) References Cited

OTHER PUBLICATIONS

Lei, Tao et al., "Simple Recurrent Units for Highly Parallelizable Recurrence", Proceedings of the Conference on Empirical Methods in Natural Language Processing, 2018.

Li, P., et al. "An Attention Pooling based Representation Learning Method for Speech Emotion Recognition," Proc. Interspeech 2018, pp. 3087-3091.

Li, R., et al. "Dilated Residual Network with Multi-Head Self-Attention for Speech Emotion Recognition," In ICASSP 2019-2019 IEEE International Conference on Acoustics, Speech and Signal Processing (ICASSP), IEEE, 2019, pp. 6675-6679.

Li et al., "Efficient Hyperparameter Optimization and Infinitely Many Armed Bandits", CoRR, 2016.

Li, Jiwei et al., "Understanding Neural Networks through Representation Erasure", 2016.

Lin, Bingqian et al., "Jointly Deep Multi-View Learning for Clustering Analysis", arXiv preprint arXiv:1808.06220, 2018.

Lin, Junyang et al., "Learning When to Concentrate or Divert Attention: Self-Adaptive Attention Temperature for Neural Machine Translation", Proceedings of the 2018 Conference on Empirical Methods in Natural Language Processing, pp. 2985-2990, Nov. 2018.

Linton, Ian "How to Make a Customer Service Process Flowchart", Sep. 26, 2017, pp. 1-8.

Liu, Y., et al. "RoBERTa: A Robustly Optimized BERT Pretraining Approach," 2019.

Logeswaran, Lajanugen et al., "An Efficient Framework for Learning Sentence Representations", In Proceedings of the International Conference on Learning Representations (ICLR) 2018.

Lu, Z., et al. "Speech Sentiment Analysis via Pre-trained Features from End-to-End ASR Models," In ICASSP 2020-2020 IEEE International Conference on Acoustics, Speech and Signal Processing (ICASSP), IEEE, 2020, pp. 7149-7153.

Lugosch, L., et al. "Speech Model Pre-training for End-to-End Spoken Language Understanding," 2019, pp. 814-818.

Martins, Andre F.T., et al., "From Softmax to Sparsemax: A Sparse Model of Attention and Multi-Label Classification", 2016.

Mintz et al., "Distant Supervision for Relation Extraction Without Labeled Data", In Proceedings of the Association for Computational Linguistics (ACL), 2009.

Mirsamadi, S., et al. "Automatic Speech Emotion Recognition Using Recurrent Neural Networks with Local Attention," In 2017 IEEE International Conference on Acoustics, Speech and Signal Processing (ICASSP), pp. 2227-2231.

Mohammad, S. "A Practical Guide to Sentiment Annotation: Challenges and Solutions," In Proceedings of the 7th Workshop on Computational Approaches to Subjectivity, Sentiment and Social Media Analysis, 2016, pp. 174-179.

Mrkšić, Nikola et al., "Multi-Domain Dialog State Tracking Using Recurrent Neural Networks", In Proceedings of the Association for Computational Linguistics (ACL) 2015.

Parikh, Ankur P., et al., "A Decomposable Attention Model for Natural Language Inference", 2016.

Pennington et al., "GloVe: Global Vectors for Word Representation", In Proceedings of Empirical Methods for Natural Language Processing (EMNLP), 2014.

Peyré, Gabriel et al., "Computational Optimal Transport", Foundations and Trends in Machine Learning, vol. 11, No. 5-6, pp. 355-607, 2019.

Quattoni et al., "Conditional Random Fields for Object Recognition", In Advances in Neural Information Processing Systems, 2005.

Rabiner, Lawrence R., "A Tutorial on Hidden Markov Models and Selected Applications in Speech Recognition", Proceedings of the IEEE, 1989.

Sadikov, Eldar et al., "Clustering Query Refinements by User Intent", In Proceedings of the International Conference on World Wide Web, 2010.

Sanh, V., et al. "DistilBERT, a Distilled Version of BERT: Smaller, Faster, Cheaper and Lighter," 2019.

Shah, Darsh et al., "Adversarial Domain Adaptation for Duplicate Question Detection", In Proceedings of Empirical Methods for Natural Language Processing (EMNLP) 2018.

Sinkhorn, Richard et al., "Concerning Nonnegative Matrices and Doubly Stochastic Matrices", Pacific Journal of Mathematics, vol. 21, No. 2, pp. 343-348, 1967.

Siriwardhana, S., et al. "Jointly Fine-Tuning "BERT-like" Self Supervised Models to Improve Multimodal Speech Emotion Recognition," Proc. Interspeech 2020, pp. 3755-3759.

Snell, Jake et al., "Prototypical Networks for Few-Shot Learning", In Neural Information Processing Systems (NIPS) 2017.

Stubbs et al., "Annotating Longitudinal Clinical Narratives for De-identification: The 2014 i2b2/UTHealth Corpus", Journal of Biomedical Informatics, 2015.

Tableau "Customer Experience, Service, and Support Dashboards", Oct. 24, 2020.

Tian et al., "Contrastive Representation Distillation", In Proceedings of the International Conference on Learning Representations (ICLR), 2020.

Tzeng et al., "Adversarial Discriminative Domain Adaptation", In Proceedings of the IEEE Conference on Computer Vision and Pattern Recognition, 2017.

Venkatesan et al., "A Novel Progressive Learning Technique for Multi-class Classification", Neurocomputing, 2016.

Wiegreffe, Sarah et al., "Attention is not not Explanation", 2019.

Williams, Jason, "A Belief Tracking Challenge Task for Spoken Dialog Systems", In Proceedings of the NAACL-HLT Workshop on Future Directions and Needs in the Spoken Dialog Community, 2012.

Williams, Jason et al., The Dialog State Tracking Challenge, In Proceedings of the SIGDIAL Conference, 2013.

Wolf, T., et al. "Transformers: State-of-the-Art Natural Language Processing," 2019.

Wu, X., et al. "Speech Emotion Recognition Using Capsule Networks," In ICASSP, IEEE International Conference on Acoustics, Speech and Signal Processing (ICASSP). IEEE, 2019, pp. 6695-6699.

Xie, Qizhe et al., "An Interpretable Knowledge Transfer Model for Knowledge Base Completion", 2017.

Xie, Y., et al. "Speech Emotion Classification Using Attention-Based LSTM," IEEE/ACM Transactions on Audio, Speech, and Language Processing, vol. 27, No. 11, pp. 1675-1685, 2019.

Xie, Junyuan et al., "Unsupervised Deep Embedding for Clustering Analysis", In Proceedings of the International Conference on Machine Learning (ICML) 2016.

Xu, Hongteng et al., "Gromov-Wasserstein Learning for Graph Matching and Node Embedding", Proceedings of the 36th International Conference on Machine Learning, 2019.

Yang, Bo et al., "Towards k-means-friendly Spaces: Simultaneous Deep Learning and Clustering", In Proceedings of the International Conference on Machine Learning (ICML) 2016.

Yang, Z., et al. "XLNET: Generalized Autoregressive Pretraining for Language Understanding," 33rd Conference on Neural Information Processing Systems, 2019.

Yang et al., "Design Challenges and Misconceptions in Neural Sequence Labeling", In Proceedings of the 27th International Conference on Computational Linguistics (COLING), 2018.

Yih et al., "Semantic Parsing via Staged Query Graph Generation: Question Answering with Knowledge Base", In Proceedings of the Association for Computational Linguistics (ACL), 2015.

Yu, Mo et al., "Rethinking Cooperative Rationalization: Introspective Extraction and Complement Control", Proceedings of the 2019 Conference on Empirical Methods in Natural Language Processing, 2019.

Yu, Qiuping "When Providing Wait Times, It Pays to Underpromise and Overdeliver", Harvard Business Review, Oct. 21, 2020.

* cited by examiner

Graphical Example

1. Corpus Building

Build a corpus of document vectors

|       | $w_1$ | $w_2$ | ... | $w_n$ |
|-------|-------|-------|-----|-------|
| $d_1$ | 1     | 0     | ... | 0     |
| $d_2$ | 0     | 1     | ... | 1     |
| ⋮     | ⋮     | ⋮     | ⋮   | ⋮     |
| $d_m$ | 1     | 0     | ... | 1     |

2. Text Preprocessing of New Document

Let $d = w_1 w_2 ... w_n$

Turn d in a vector

| 1 | 1 | ... | 1 |

3. Privacy Threshold Filtering

Filter frequency < p

| 1 | 0 | ... | 1 |

4. k-Anonymity Sanitization

Ensure k-anonymity

| 0 | 0 | ... | 1 |

5. Document Sanitization

Redact $d \rightarrow$ ▓ ▓ ... $w_n$

SYSTEM, METHOD, AND COMPUTER PROGRAM FOR TEXT SANITIZATION

BACKGROUND OF THE INVENTION

1. Field of the Invention

This invention relates generally to document sanitization and, more specifically, to a system and method for automatically sanitizing text in heterogeneous documents.

2. Description of the Background Art

It is very useful for a business to be able to automate aspects of their customer service, thereby increasing efficiency and reducing required resources. Many such businesses employ Automatic Speech Recognition (ASR) systems and various user interface systems. In order to train the neural networks used to automate such systems, a lot of data from user interactions is needed. Unfortunately, the data used to train such systems often contains sensitive information, and it is difficult to determine which of the data is sensitive and which of the data is non-sensitive in nature. Known document sanitization techniques rely on the detection of specific information from concrete domains (e.g., credit card and social security numbers from particular databases). In other words, such techniques require customization for each domain and lack generality and scalability. Therefore, there is a need for a document sanitization method that performs automatically with respect to heterogenous documents.

Any such method would require a careful balance between how much data to redact and how much data to maintain. If a system over-redacts data, then the remaining data is less useful for training purposes. If the system does not redact enough, then it may leave sensitive information in the documents. Therefore, there is also a need to optimize redaction while removing any sensitive information, such that the data is still useful for training.

SUMMARY OF THE DISCLOSURE

The present disclosure describes a system, method, and computer program for text sanitization. The method is performed by a computer system that includes servers, storage systems, networks, operating systems, and databases.

The present invention provides a system and method for automatically sanitizing text in heterogeneous documents. It does this through three main sanitization steps with respect to a corpus of document vectors (i.e., vector representations of documents based on the tokens in the documents). First, the system filters tokens in a new document against a privacy threshold, where the tokens having a frequency in the corpus of document vectors below a threshold are flagged as unsafe. This is based on the principle that very infrequent words are likely to be sensitive information, but frequent words are likely to be common information. Second, the system performs a k-anonymity sanitization process such that the new document vector becomes indistinguishable from at least k other document vectors in the corpus of document vectors. While k-anonymity is a known technique, it is not well-understood, routine, or conventional in the field to combine it with privacy threshold filtering. Furthermore, it is challenging to select the optimal k-value such that the system redacts the minimum number of tokens. While a linear programming approach may be helpful in finding an optimal k vector, it is computationally very expensive. The present invention provides a heuristic approach to finding the near-optimal k vector, which is computationally much more efficient and, therefore, faster. Third, the system replaces or redacts the tokens in the document flagged as unsafe using a machine-learning language model to predict a vector representation.

In one embodiment, a method for text sanitization comprises the following steps:
building a corpus of document vectors by performing the following:
obtaining a plurality of documents;
tokenizing each of the plurality of documents;
for each of the plurality of documents, creating a vector representation of the document based on the tokens in the document;
building a corpus of document vectors comprising the vector representations for the plurality of documents;
obtaining a new document for text sanitization;
tokenizing the new document;
creating a new document vector based on the tokens in the new document;
accessing the corpus of document vectors;
filtering each of the tokens in the new document against a privacy threshold, wherein any tokens having a frequency in the corpus of document vectors below the privacy threshold are flagged as unsafe;
performing a k-anonymity sanitization process such that the new document vector becomes indistinguishable from at least k other document vectors in the corpus of document vectors, wherein k is a positive integer, and wherein, during the k-anonymity sanitization process, tokens in the document are flagged as either safe or unsafe;
replacing or redacting the tokens in the document flagged as unsafe; and
updating the corpus of document vectors to include the new document vector in its form prior to the filtering and k-anonymity sanitization steps.

DETAILED DESCRIPTION OF THE PREFERRED EMBODIMENTS

The present disclosure describes a system, method, and computer program for text sanitization. The method is performed by a computer system that includes servers, storage systems, networks, operating systems, and databases ("the system").

Example implementations of the methods are described in more detail with respect to FIGS. 1-6.

1. Method for Privacy-Preserving Text Sanitization

Figure 1:
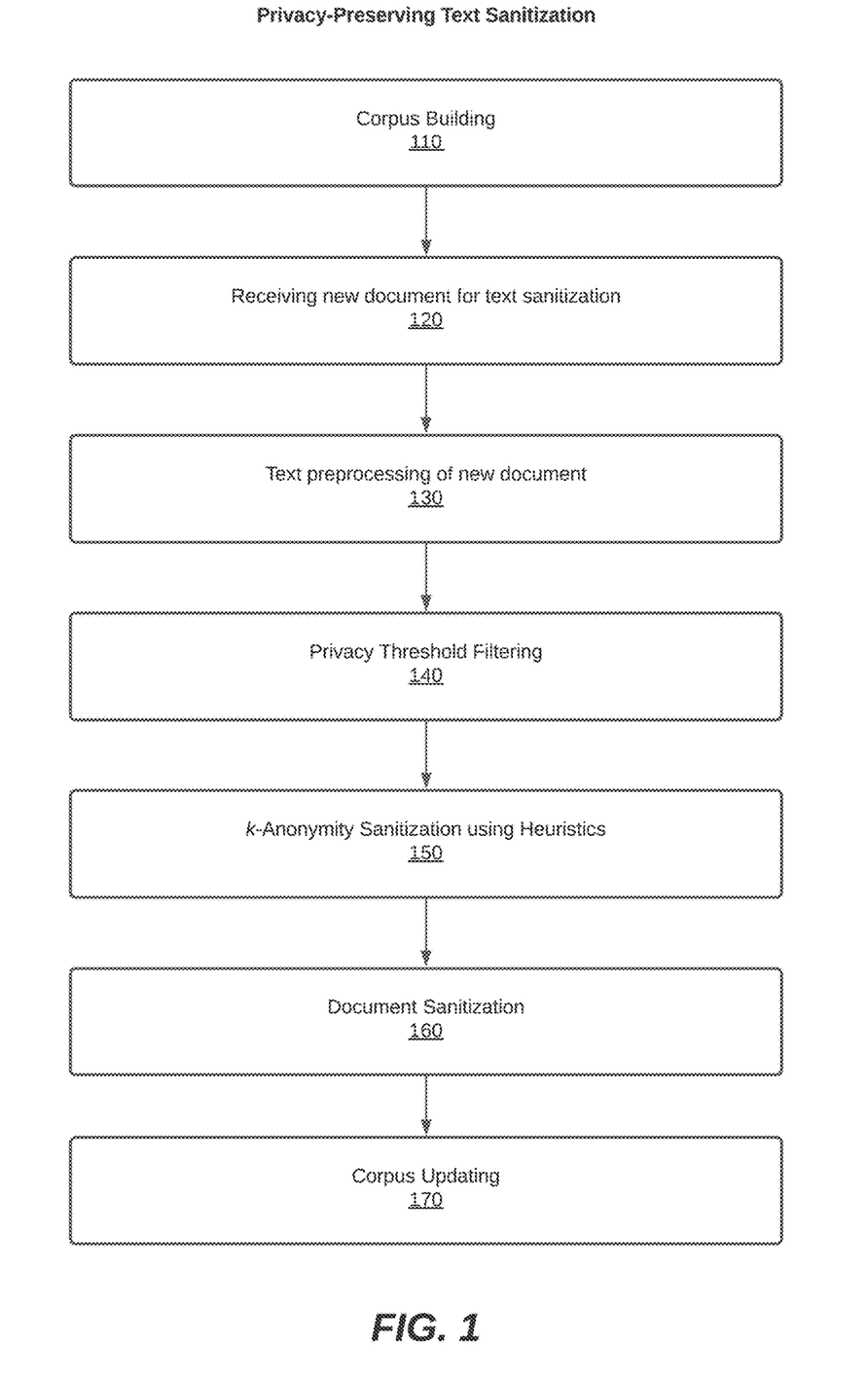
FIG. 1 is a flowchart that illustrates a method, according to one embodiment, for privacy-preserving text sanitization.
Figure 2A:
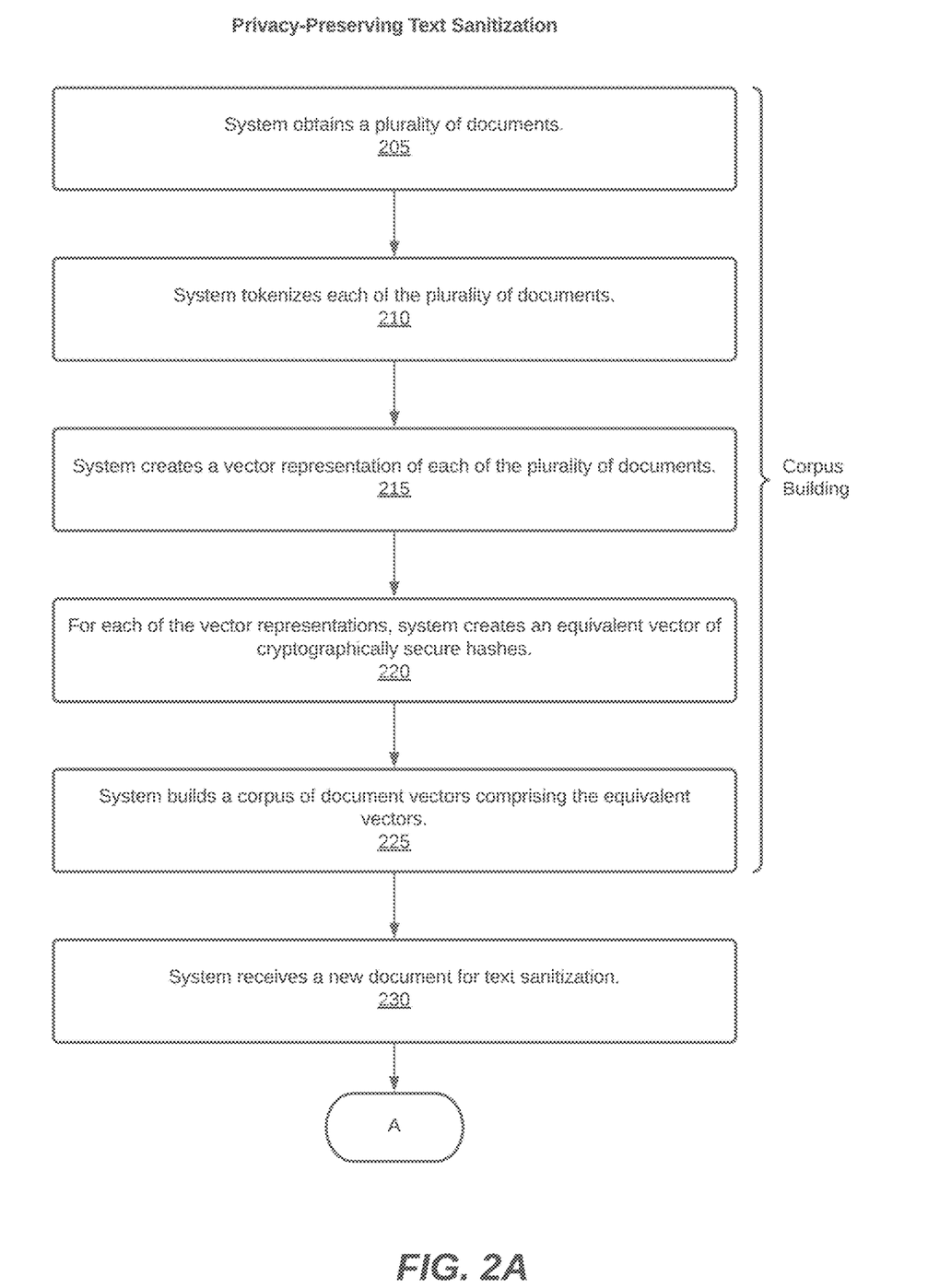
FIGS. 2A-2B are flowcharts that illustrate the method of FIG. 1, according to one embodiment, in greater detail.
Figure 2B:
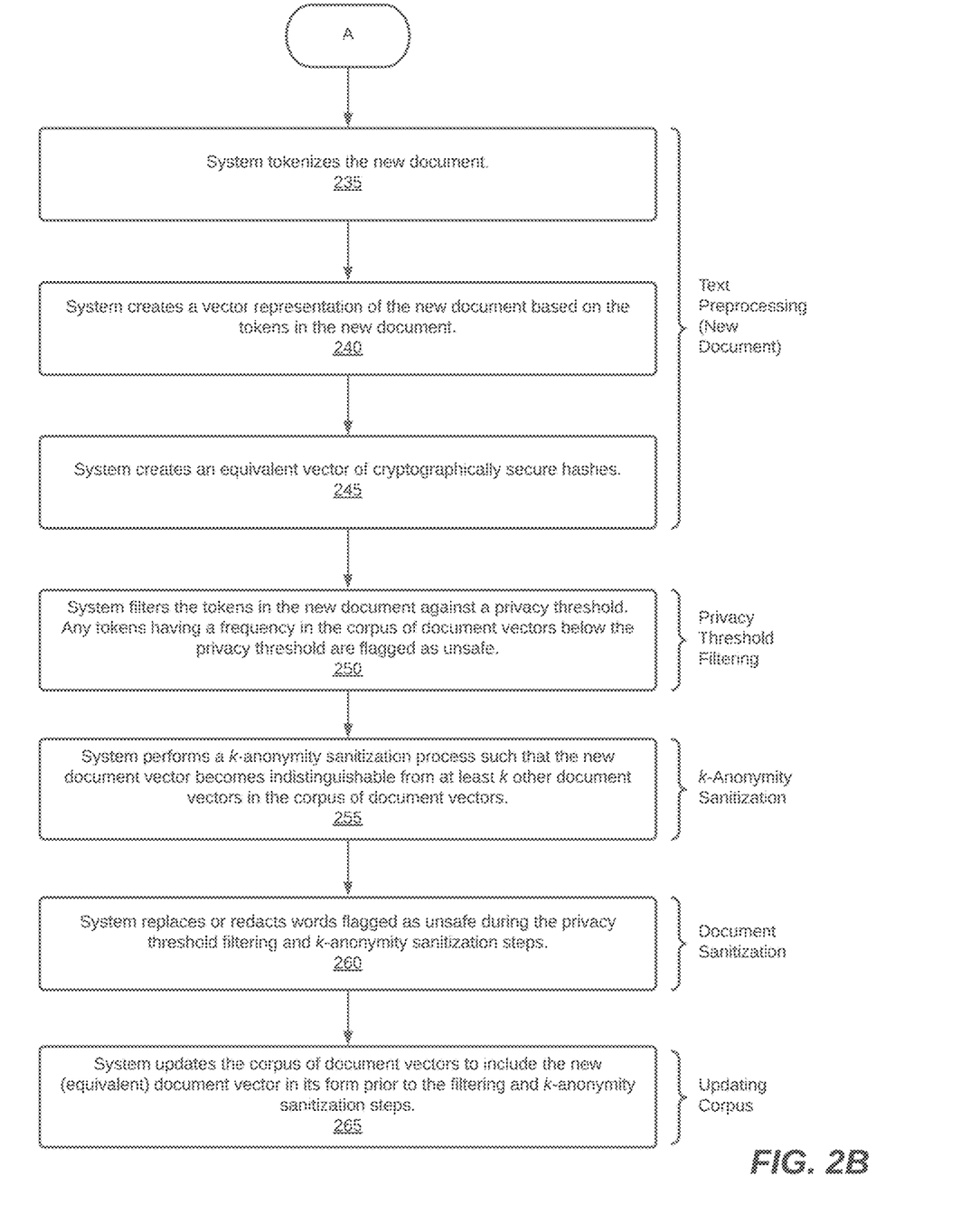

FIGS. 1 and 2A-2B illustrate a method for text sanitization. As illustrated in FIG. 1, in one embodiment, the text sanitization method includes the following steps: corpus building (step 110), receiving a new document for text sanitization (step 120), text preprocessing of the new document (step 130), privacy threshold filtering (step 140), k-anonymity sanitization using heuristics (step 150), document sanitization (step 160), and corpus updating (step 170). These steps are described in more detail with respect to FIGS. 2A-2B.

1.1 Corpus Building

As seen in FIG. 2A, the corpus building step from FIG. 1 includes the system obtaining a plurality of documents (step 205), where a document is a collection of words. For example, text generated during a time interval would be treated as a document. In a customer service setting, a document is formed by all the textual information shared during the resolution of an issue (e.g., a user-agent conversation, text rendered in the user interface of an application used by a customer service agent, etc.). The system tokenizes each of the plurality of documents (step 210). The system creates a vector representation of each of the plurality of documents (step 215). In certain embodiments, the vector representation of the document indicates the tokens present in the document. In certain embodiments, the vector representation includes a first bit value for each token in a vocabulary that is present in the document and a second bit value for each token in the vocabulary that is not present in the document. For example, the vector representation may include a "1" for each word the document contains and a "0" for each word the document does not contain. In certain embodiments, a vocabulary is the set of all the tokenized words that have been seen and inserted into the corpus of document vectors. In certain embodiments, the dimension of the vector is the whole vocabulary.

In certain embodiments, for each of the vector representations, the system creates an equivalent vector of cryptographically secure hashes (e.g., the equivalent vector is comprised of the SHA256 hash of each of the words in the original vector using a PBKDF2 approach) (step 220) and builds a corpus of document vectors comprising the equivalent vectors (step 225), where a corpus is a database of vectors. This allows for the original vector to be maintained without storing any sensitive information.

1.2 Text Preprocessing

The system receives a new document for text sanitization (step 230). As seen in FIG. 2B, the text preprocessing step of FIG. 1 includes the system tokenizing the new document (step 235). The system creates a vector representation of the new document based on the tokens in the new document (step 240). In certain embodiments, the system creates an equivalent vector of cryptographically secure hashes (step 245).

1.3 Privacy Threshold Filtering

The privacy threshold filtering step of FIG. 1 includes the system filtering the tokens in the new document against a privacy threshold (step 250). Any tokens having a frequency in the corpus of document vectors below the privacy threshold are flagged as unsafe. An example of a privacy threshold is p=0.005.

1.3 k-Anonymity Sanitization

Figure 4A:
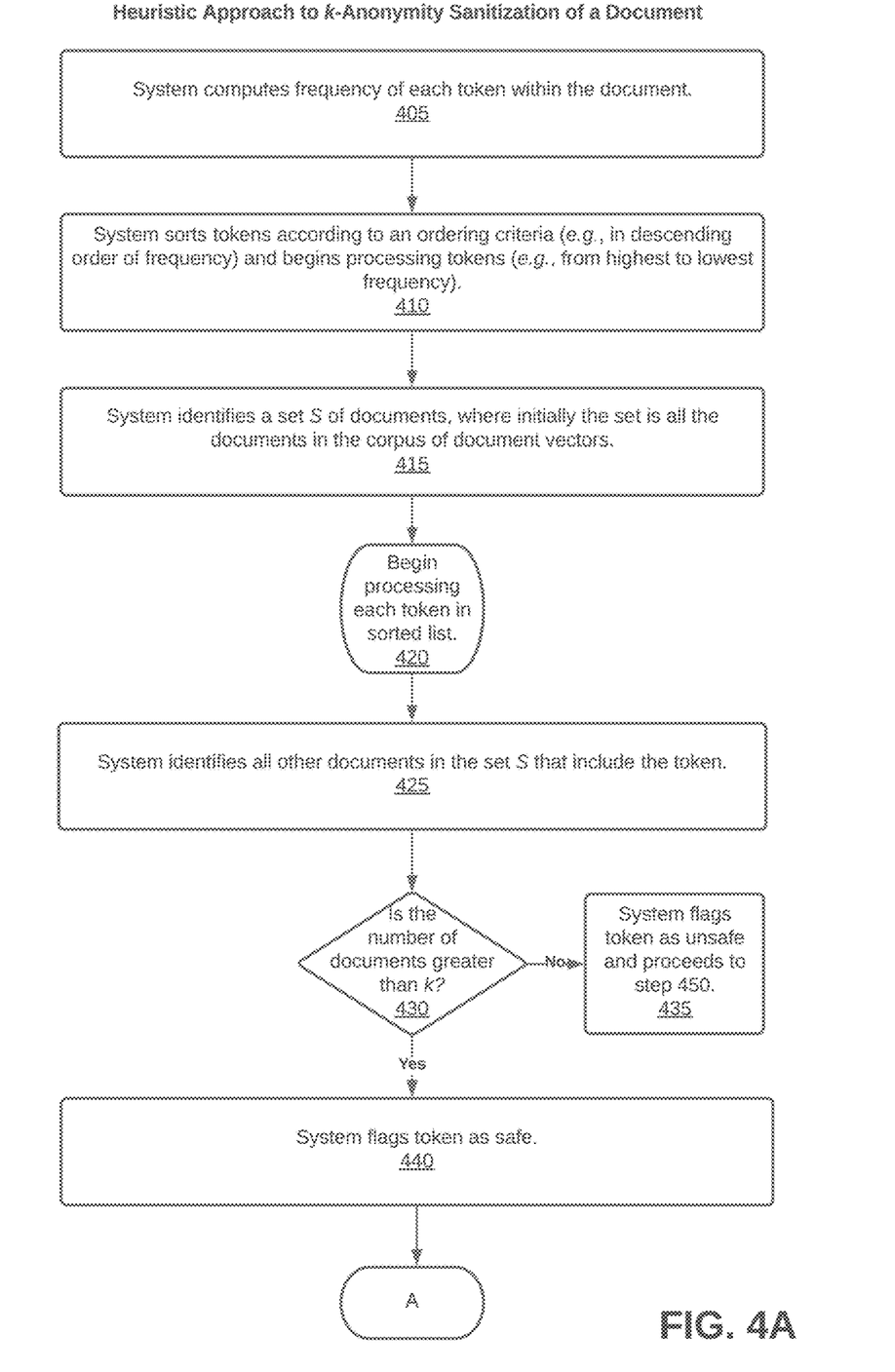
FIGS. 4A-4B are flowcharts that illustrate a method, according to one embodiment, for a heuristic approach to k-anonymity sanitization of a document.
Figure 4B:
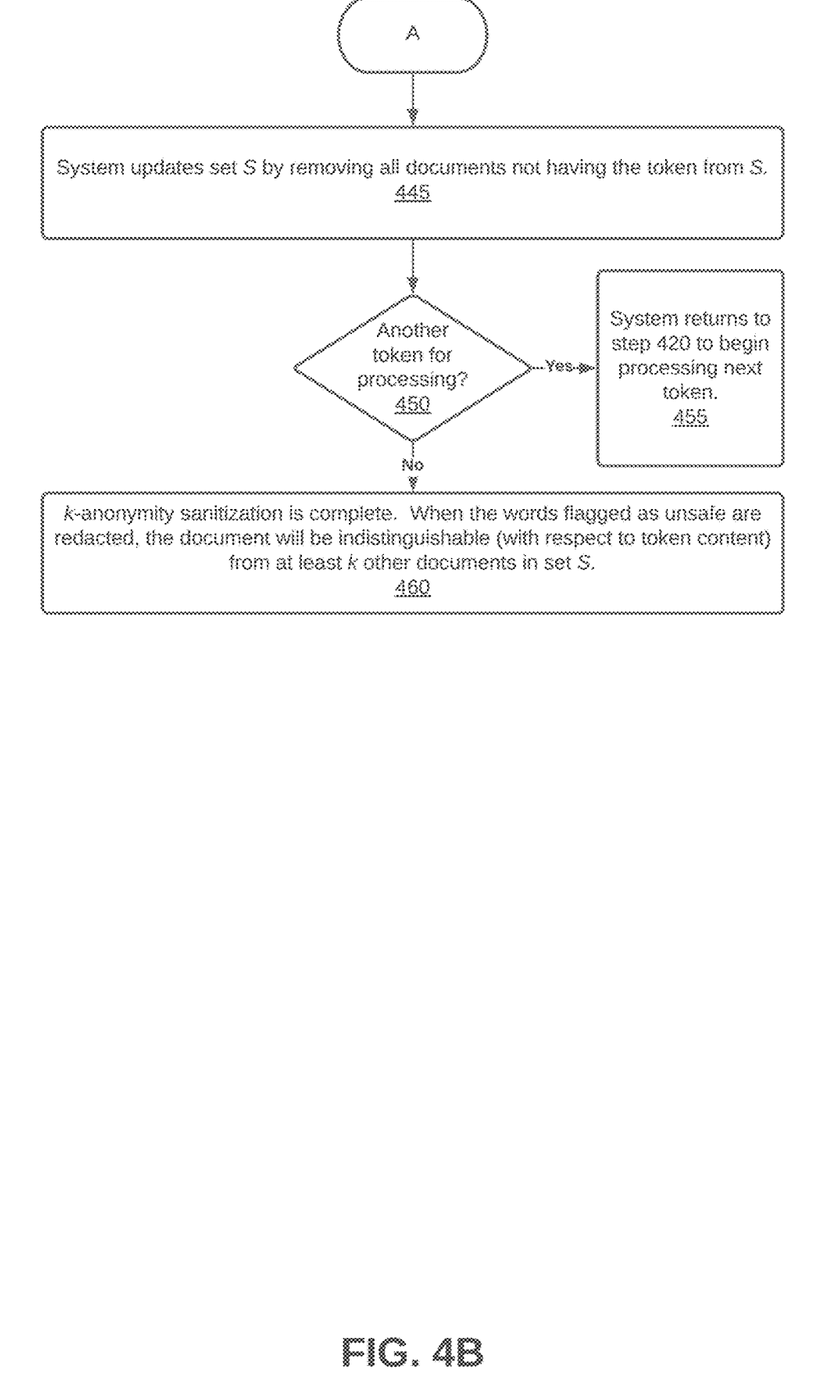

The k-anonymity sanitization step of FIG. 1 includes the system performing a k-anonymity sanitization process such that the new document vector becomes indistinguishable from at least k other document vectors in the corpus of document vectors (step 255), as seen in greater detail with respect to FIGS. 4A-4B. In certain embodiments, k is a positive integer, and during the k-anonymity sanitization process, tokens in the document are flagged as either safe or unsafe. As mentioned above, a k-anonymity sanitization process is not often combined with a privacy filtering threshold. The unforeseen benefit of combining the two methods is that, whereas a system may, for example, typically use a k-value of 4, 5, or 6, combined with a privacy threshold filtering step, the k-value can be reduced to, for example, 2 or 3 and still receive optimal safety properties, but avoid over-redaction within a document.

1.4 Document Sanitization

Figure 5:
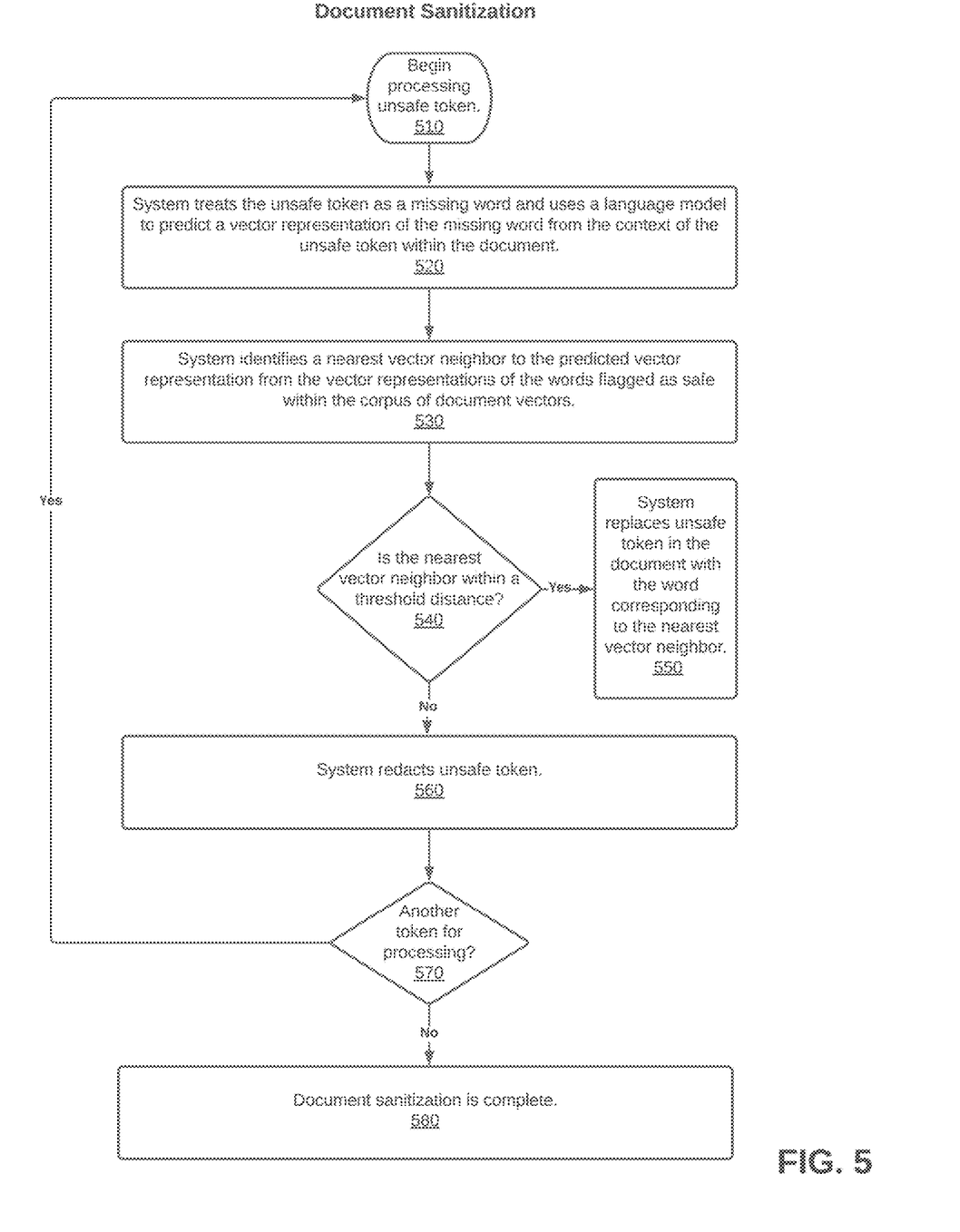
FIG. 5 is a flowchart that illustrates a method, according to one embodiment, for document sanitization.

The document sanitization step of FIG. 1 includes the system replacing or redacting words flagged as unsafe during the privacy threshold filtering and k-anonymity sanitization steps (step 260), as seen in greater detail with respect to FIG. 5.

1.5 Updating Corpus

The updating corpus step of FIG. 1 includes the system updating the corpus of document vectors to include the new (equivalent) document vector in its form prior to the filtering and k-anonymity sanitization steps (step 265).

1.6 Graphical Example

Figure 3:
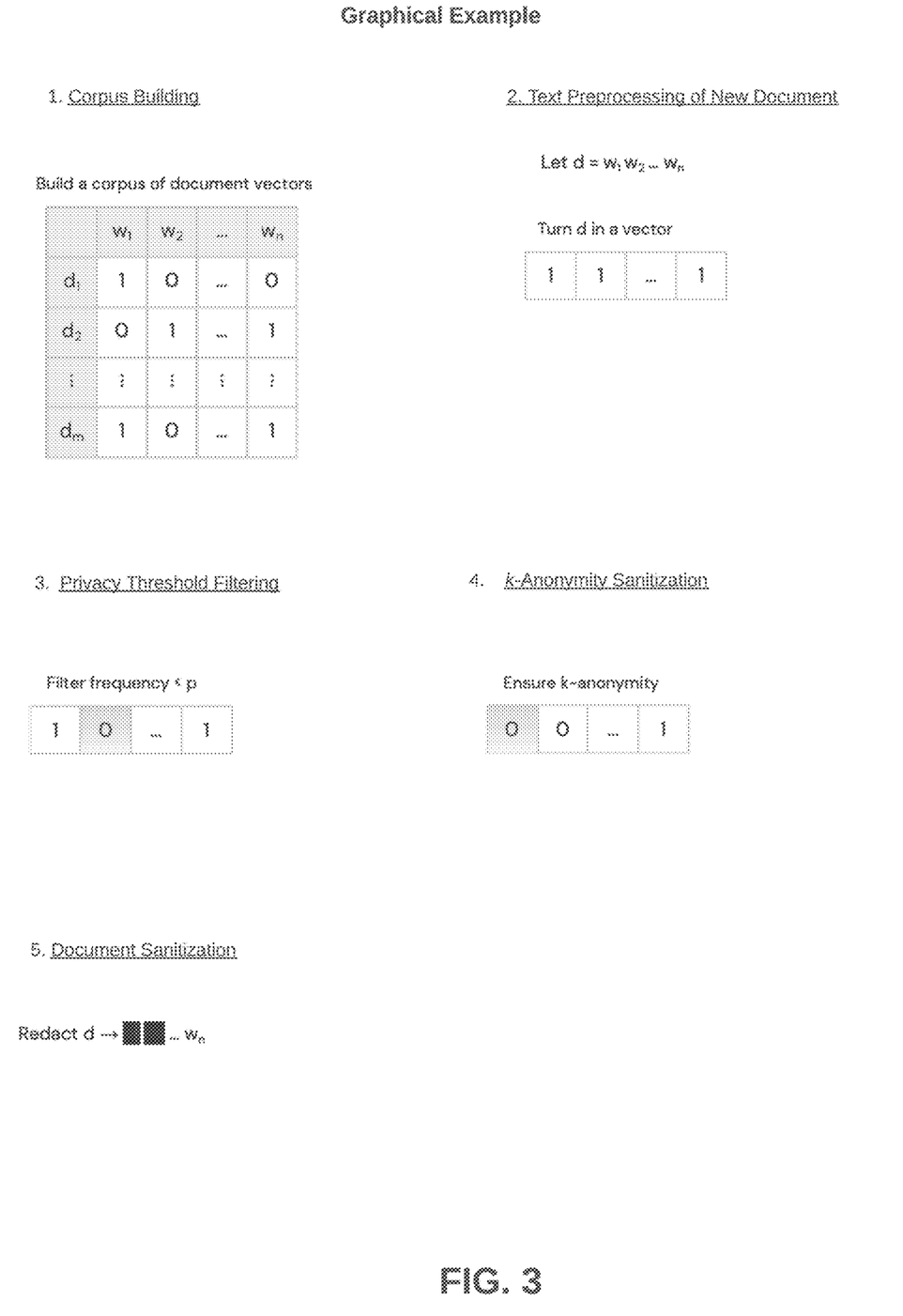
FIG. 3 is a graphical example of the methods of FIGS. 1-2B according to one embodiment.

FIG. 3 illustrates a graphical example for the methods of text sanitization, including corpus building, text preprocessing of a new document, privacy threshold filtering, k-anonymity sanitization, and document sanitization. The steps show how a vector changes and what will be redacted. For example, in step 3, the second "1" has been changed to a "0" during the privacy threshold filtering step. This means that the token (or word) corresponding to the "1" is flagged as unsafe and will be replaced or redacted.

2. Method for Heuristic Approach to k-Anonymity Sanitization of a Document

FIGS. 4A-4B illustrate a method for a heuristic approach to k-anonymity sanitization of a document. The system computes the frequency of each token within the document (i.e., both the new document and the corpus of document vectors) (step 405). The system sorts the tokens according to an ordering criteria and begins processing the tokens (step 410). For example, the system may sort in descending order of frequency (from highest to lowest frequency), or the system may sort using another ordering criteria. In certain embodiments, a more elaborate ordering criteria may result in a more optimized solution, but at a higher computational cost. The system identifies a set S of documents, where initially the set is all the documents in the corpus of document vectors (step 415).

The system begins processing each token in the sorted list of tokens (in order) (step 420). The system identifies all other documents in the set S that include the token (step 425). The system determines if the number of documents is greater than k (step 430). If the system determines that the number of documents is not greater than k, the system flags the token as unsafe and proceeds to step 450 (step 435). If the system determines that the number of documents is greater than k, the system flags the token as safe (step 440).

If the token being processed is flagged as safe, the system updates set S by removing all documents not having the token from S (step 445). If, however, the token is flagged as unsafe, the system leaves set S unchanged. The system determines whether there is another token for processing (step 450). If the system determines that there is another token for processing, the system returns to step 420 to begin processing the next token (step 455). If the system determines there is no other token for processing, the k-anonymity sanitization is complete (step 460). When the words flagged as unsafe are redacted, the document will be indistinguishable (with respect to token content) from at least k other documents in set S (step 460).

In certain embodiments, where a BOW vector is used (i.e., a bag of words vector where "1" means the token is present in the document, and "0" means the token is not present in the document), the bit value in the vector corresponding to an unsafe token is changed from "1" to "0," and then the unsafe token is later redacted from the document.

3. Method for Document Sanitization

FIG. 5 illustrates a method for document sanitization. The system begins processing an unsafe token (step 510). The system treats the unsafe token as a missing word and uses a machine-learning language model to predict a vector representation of the missing word from the context of the unsafe token within the document (step 520). Examples of machine-learning language models include BERT and word2vec. The system identifies the nearest vector neighbor to the predicted vector representation from the vector representations of the words flagged as safe within the corpus of document vectors (step 530). The system determines whether the nearest vector neighbor is within a threshold distance of the predicted vector representation (step 540). In certain embodiments, the threshold distance is determined using a Euclidean distance. If the system determines that the nearest vector neighbor is within a threshold distance of the predicted vector representation, the system replaces the unsafe token in the document with the word corresponding to the nearest vector neighbor (step 550). In other words, the unsafe token is replaced with a similar word that is flagged as safe. If the system determines that the nearest vector neighbor is not within a threshold distance of the predicted vector representation, the system redact the unsafe token from the document (step 560). The system determines whether there is another token for processing (step 570). If the system determines that there is another token for processing, the system returns to step 510 to begin processing the unsafe token. If the system determines that there is no other token for processing, the document sanitization process is complete (step 580).

4. Example System Architecture

Figure 6:
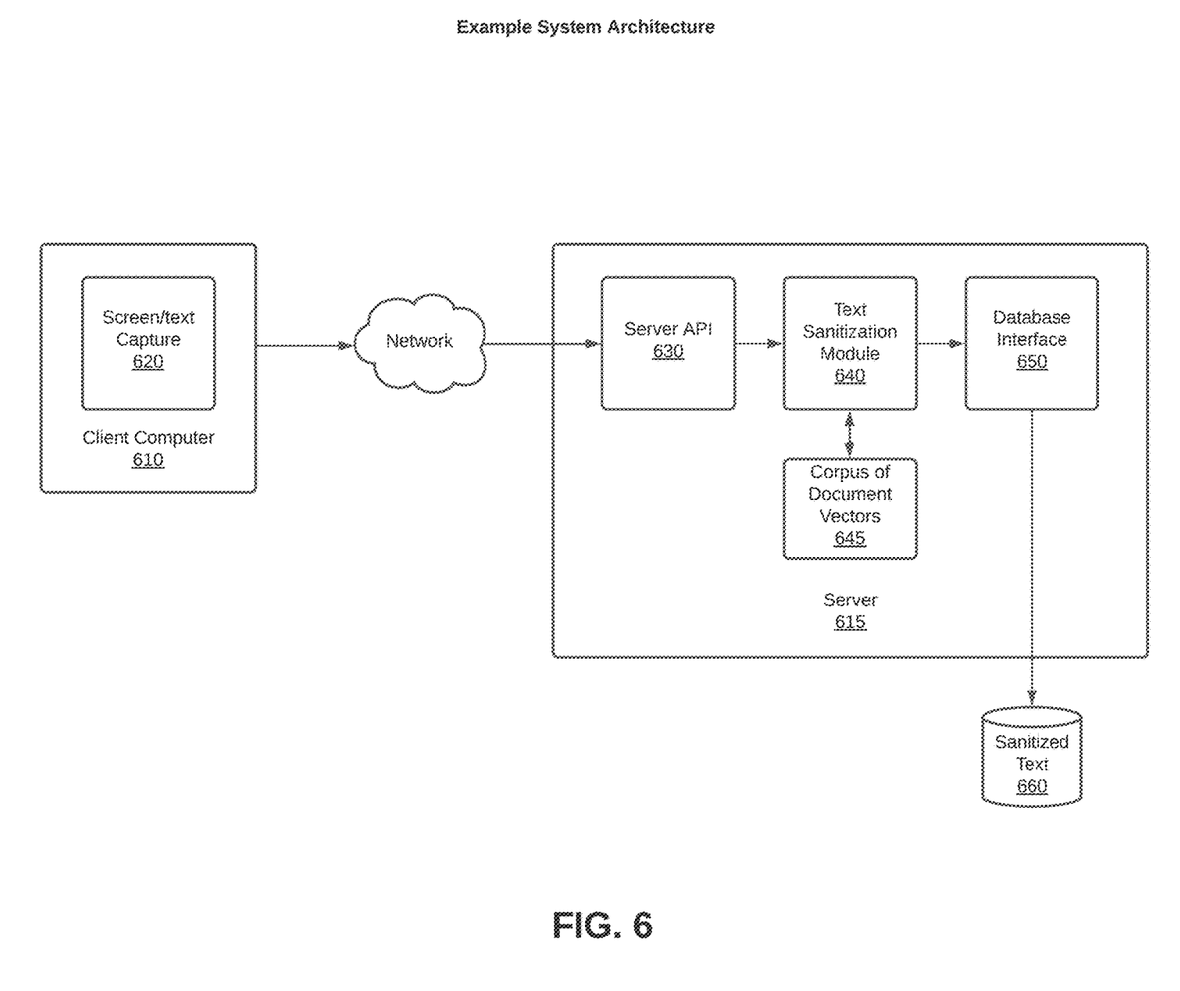
FIG. 6 is a block diagram that illustrates an example system architecture according to one embodiment.

FIG. 6 illustrates an example architecture for a system that performs the methods described herein. However, the methods described herein may be implemented in other systems and are not limited to the illustrated system.

As illustrated in FIG. 6, a client computer 610 communicates with a server 615 over a network. The client computer 610 has a screen/text capture module 620, which is an application running on an agent's computer that captures screen information from a customer service application used by the agent or that captures text from a chat window between users and agents. Information from the screen/text capture module 620 is received at the server API 630, where it is passed to the text sanitization module 640. The text sanitization module 640 performs the methods described herein on the information, using of the corpus of document vectors 645. In certain embodiments, the text sanitization module 640 creates and stores an equivalent vector of cryptographically secure hashes in the corpus of document vectors 645, as well as queries the corpus of document vectors 645 and hashes each word in the queried documents, and stores a mapping of tokens flagged as safe to their language model embedding. The sanitized documents are passed to the database interface 650, which interfaces with and stores the sanitized documents in a database for sanitized text 660.

5. General

The methods described with respect to FIGS. 1-6 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for text sanitization, the method comprising:
   building a corpus of document vectors by performing the following:
      obtaining a plurality of documents;
      tokenizing each of the plurality of documents;
      for each of the plurality of documents, creating a vector representation of the document based on the tokens in the document;
      building a corpus of document vectors comprising the vector representations for the plurality of documents;
   obtaining a new document for text sanitization;
   tokenizing the new document;
   creating a new document vector based on the tokens in the new document;
   accessing the corpus of document vectors;
   filtering each of the tokens in the new document against a privacy threshold, wherein any tokens having a frequency in the corpus of document vectors below the privacy threshold are flagged as unsafe;
   performing a k-anonymity sanitization process such that the new document vector becomes indistinguishable from at least k other document vectors in the corpus of document vectors, wherein k is a positive integer, and wherein, during the k-anonymity sanitization process, tokens in the document are flagged as either safe or unsafe;
   replacing or redacting the tokens in the document flagged as unsafe, wherein replacing or redacting the tokens in the document flagged as unsafe comprises the following for each token flagged as unsafe;
      treating the unsafe token as a missing word and using a machine-learning language model to predict a vector representation of the missing word from a context of the unsafe token within the document,
      obtaining a predicted vector representation for the missing word from the machine-learning language model,
      identifying a nearest vector neighbor to the predicted vector representation from the vector representations of words flagged as safe within the corpus of document vectors,
      determining whether the nearest vector neighbor is within a threshold distance of the predicted vector representation,
      in response to the nearest vector neighbor being within a threshold distance of the predicted vector representation, replacing the unsafe token in the document with the word corresponding to the nearest vector neighbor, and in response to the nearest vector neighbor not being within a threshold distance of the predicted vector representation, redacting the unsafe token from the document; and updating the corpus of document vectors to include the new document vector in its form prior to the filtering and k-anonymity sanitization steps.

2. The method of claim 1, wherein the k-anonymity sanitization process comprises the following:

computing a frequency of each token within the document;

sorting tokens according to an ordering criteria;

identifying a set of documents, wherein initially the set is all the documents in the corpus of document vectors;

performing the following for each token according to the ordering criteria:

identifying all other documents in the set that include the token;

determining if the number of identified documents is greater than k;

in response to the number of identified documents being greater than k, flagging the token as safe, and updating the set to include only those documents having the token; and in response to the number of identified documents being less than k, flagging the token as unsafe.

3. The method of claim 1, wherein, for each document vector created, the system creates an equivalent vector of cryptographically secure hashes and builds the corpus of document vectors using the equivalent vectors.

4. The method of claim 1, wherein, for each document, including the new document, the vector representation of the document indicates the tokens present in the document.

5. The method of claim 1, wherein the vector representation includes a first bit value for each token in a vocabulary that is present in the document and a second bit value for each token in the vocabulary that is not present in the document.

6. A non-transitory computer-readable medium comprising a computer program, that, when executed by a computer system, enables the computer system to perform the following steps for text sanitization, the steps comprising:

building a corpus of document vectors by performing the following:

obtaining a plurality of documents;

tokenizing each of the plurality of documents;

for each of the plurality of documents, creating a vector representation of the document based on the tokens in the document;

building a corpus of document vectors comprising the vector representations for the plurality of documents;

obtaining a new document for text sanitization;

tokenizing the new document;

creating a new document vector based on the tokens in the new document;

accessing the corpus of document vectors;

filtering each of the tokens in the new document against a privacy threshold, wherein any tokens having a frequency in the corpus of document vectors below the privacy threshold are flagged as unsafe;

performing a k-anonymity sanitization process such that the new document vector becomes indistinguishable from at least k other document vectors in the corpus of document vectors, wherein k is a positive integer, and wherein, during the k-anonymity sanitization process, tokens in the document are flagged as either safe or unsafe;

replacing or redacting the tokens in the document flagged as unsafe, wherein replacing or redacting the tokens in the document flagged as unsafe comprises the following for each token flagged as unsafe:

treating the unsafe token as a missing word and using a machine-learning language model to predict a vector representation of the missing word from a context of the unsafe token within the document, obtaining a predicted vector representation for the missing word from the machine-learning language model, identifying a nearest vector neighbor to the predicted vector representation from the vector representations of words flagged as safe within the corpus of document vectors, determining whether the nearest vector neighbor is within a threshold distance of the predicted vector representation, in response to the nearest vector neighbor being within a threshold distance of the predicted vector representation, replacing the unsafe token in the document with the word corresponding to the nearest vector neighbor, and in response to the nearest vector neighbor not being within a threshold distance of the predicted vector representation, redacting the unsafe token from the document; and updating the corpus of document vectors to include the new document vector in its form prior to the filtering and k-anonymity sanitization steps.

7. The non-transitory computer-readable medium of claim 6, wherein the k-anonymity sanitization process comprises the following:

computing a frequency of each token within the document;

sorting tokens according to an ordering criteria;

identifying a set of documents, wherein initially the set is all the documents in the corpus of document vectors;

performing the following for each token according to the ordering criteria:

identifying all other documents in the set that include the token;

determining if the number of identified documents is greater than k;

in response to the number of identified documents being greater than k, flagging the token as safe, and updating the set to include only those documents having the token; and in response to the number of identified documents being less than k, flagging the token as unsafe.

8. The non-transitory computer-readable medium of claim 6, wherein, for each document vector created, the system creates an equivalent vector of cryptographically secure hashes and builds the corpus of document vectors using the equivalent vectors.

9. The non-transitory computer-readable medium of claim 6, wherein, for each document, including the new document, the vector representation of the document indicates the tokens present in the document.

10. The non-transitory computer-readable medium of claim 6, wherein the vector representation includes a first bit value for each token in a vocabulary that is present in the document and a second bit value for each token in the vocabulary that is not present in the document.

11. A computer system for text sanitization, the system comprising:
one or more processors;
one or more memory units coupled to the one or more processors, wherein the one or more memory units store instructions that, when executed by the one or more processors, cause the system to perform the operations of:
building a corpus of document vectors by performing the following:
obtaining a plurality of documents;
tokenizing each of the plurality of documents;
for each of the plurality of documents, creating a vector representation of the document based on the tokens in the document;
building a corpus of document vectors comprising the vector representations for the plurality of documents;
obtaining a new document for text sanitization;
tokenizing the new document;
creating a new document vector based on the tokens in the new document;
accessing the corpus of document vectors;
filtering each of the tokens in the new document against a privacy threshold, wherein any tokens having a frequency in the corpus of document vectors below the privacy threshold are flagged as unsafe;
performing a k-anonymity sanitization process such that the new document vector becomes indistinguishable from at least k other document vectors in the corpus of document vectors, wherein k is a positive integer, and wherein, during the k-anonymity sanitization process, tokens in the document are flagged as either safe or unsafe;
replacing or redacting the tokens in the document flagged as unsafe, wherein replacing or redacting the tokens in the document flagged as unsafe comprises the following for each token flagged as unsafe:
treating the unsafe token as a missing word and using a machine-learning language model to predict a vector representation of the missing word from a context of the unsafe token within the document,
obtaining a predicted vector representation for the missing word from the machine-learning language model,
identifying a nearest vector neighbor to the predicted vector representation from the vector representations of words flagged as safe within the corpus of document vectors,
determining whether the nearest vector neighbor is within a threshold distance of the predicted vector representation,
in response to the nearest vector neighbor being within a threshold distance of the predicted vector representation, replacing the unsafe token in the document with the word corresponding to the nearest vector neighbor, and
in response to the nearest vector neighbor not being within a threshold distance of the predicted vector representation, redacting the unsafe token from the document; and
updating the corpus of document vectors to include the new document vector in its form prior to the filtering and k-anonymity sanitization steps.

12. The computer system of claim 11, wherein the k-anonymity sanitization process comprises the following:
computing a frequency of each token within the document;
sorting tokens according to an ordering criteria;
identifying a set of documents, wherein initially the set is all the documents in the corpus of document vectors;
performing the following for each token according to the ordering criteria:
identifying all other documents in the set that include the token;
determining if the number of identified documents is greater than k;
in response to the number of identified documents being greater than k, flagging the token as safe, and updating the set to include only those documents having the token; and
in response to the number of identified documents being less than k, flagging the token as unsafe.

13. The computer system of claim 11, wherein, for each document vector created, the system creates an equivalent vector of cryptographically secure hashes and builds the corpus of document vectors using the equivalent vectors.

14. The computer system of claim 11, wherein, for each document, including the new document, the vector representation of the document indicates the tokens present in the document.

15. The computer system of claim 11, wherein the vector representation includes a first bit value for each token in a vocabulary that is present in the document and a second bit value for each token in the vocabulary that is not present in the document.

* * * * *